United States Patent [19]

Hashimoto

[11] Patent Number: 4,968,224
[45] Date of Patent: Nov. 6, 1990

[54] VIBRATOR FOR DIAPHRAGM PUMP AND MAGNET HOLDER THEREFOR

[75] Inventor: Atsuki Hashimoto, Tokyo, Japan
[73] Assignee: Nitto Kohki Co., Ltd., Japan
[21] Appl. No.: 441,278
[22] Filed: Nov. 27, 1989

[30] Foreign Application Priority Data

Dec. 15, 1988 [JP] Japan ............................ 63-161889[U]

[51] Int. Cl.⁵ ............................................. F04B 45/04
[52] U.S. Cl. .................................... 417/413; 417/418; 310/17
[58] Field of Search ........................ 417/360, 413, 418; 310/15, 17, 23, 28, 30

[56] References Cited

U.S. PATENT DOCUMENTS

| | | | |
|---|---|---|---|
| 3,931,554 | 1/1976 | Spentzas | 310/30 X |
| 4,859,152 | 8/1989 | Kimura et al. | 417/418 X |
| 4,886,429 | 12/1989 | Osada et al. | 417/413 |

FOREIGN PATENT DOCUMENTS

| | | | |
|---|---|---|---|
| 57-080255 | 5/1982 | Japan | 310/15 |
| 59-117399 | 7/1984 | Japan | 310/15 |
| 61-137892 | 8/1986 | Japan . | |
| 61-252881 | 11/1986 | Japan . | |
| 63-100682 | 6/1988 | Japan . | |

Primary Examiner—Michael Koczo
Assistant Examiner—Eugene L. Szozecina, Jr.
Attorney, Agent, or Firm—Kinney & Lange

[57] ABSTRACT

A vibrator for diaphragm pump and magnet holder for the vibrator wherein a stopper is formed on the inner perimeter of the side wall of the magnet insertion window in the vicinity of one main plane of the magnet holder, and that the supporting surface of the stopper for the magnet is fixed at the distance of ½ of the difference between the thicknesses of the magnet holder and the magnet to be inserted into the magnet insertion window, from the one main plane. A plurality of said stoppers are formed partially along the inner periphery of the magnet insertion window. Recesses are formed in appropriate portions of the perimeter of the magnet insertion window, into which the bonding agent is made to flow.

11 Claims, 7 Drawing Sheets

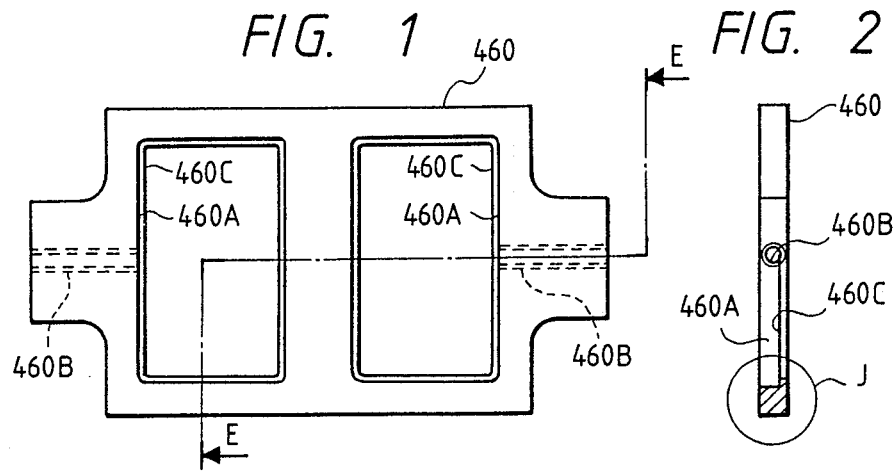
FIG. 1
FIG. 2
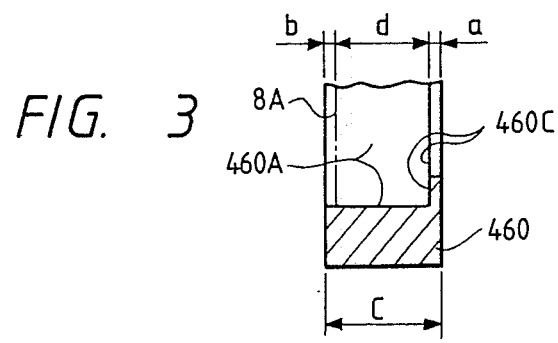
FIG. 3
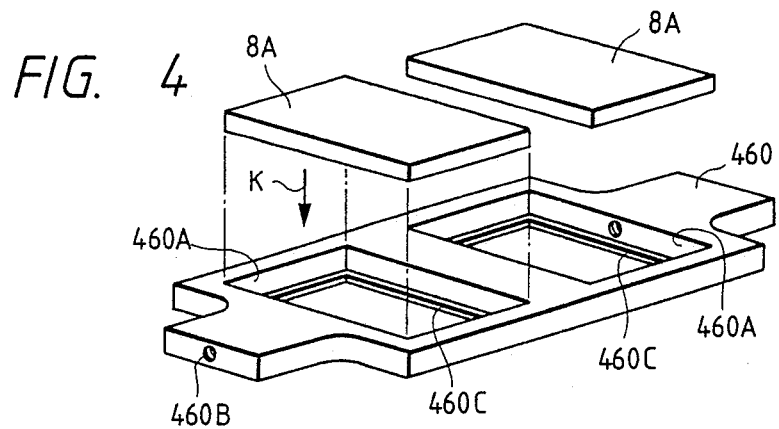
FIG. 4

VIBRATOR FOR DIAPHRAGM PUMP AND MAGNET HOLDER THEREFOR

BACKGROUND OF THE INVENTION

1. Field of the Invention

The present invention relates to a vibrator for a diaphragm pump and a magnet holder for it, and particularly to a vibrator for an electromagnetic diaphragm pump and a magnet holder for it. More specifically, the present invention relates to a vibrator and a magnet holder therefor in which it can be facilitated to coincide a central plane of the magnet holder with that of the magnet which is thinner than the magnet holder in the direction of their thickness when the magnet is attached to the magnet holder.

2. Description of the Prior Art

A conventional electromagnetic diaphragm pump is described by using the drawings. FIG. 8 is a cross-sectional view when the conventional electromagnetic diaphragm pump is seen from the front thereof, FIG. 9 is a plan view of the diaphragm pump of FIG. 8, and FIG. 10 is a side view along the X—X line of FIG. 9.

In these figures, a housing 1 is made by the press operation of a metal plate, and each of side plates 1A is punched with a circular hole 1B, the side plates being bent at both ends thereof so as to oppose each other.

A pair of diaphragm plates 2 made of an elastic material such as rubber are fitted into the circular holes 1B, respectively. The peripheral portion of each diaphragm 4 is pinched by and between corresponding the diaphragm plate 2 and a head cover 3, which are attached to the side plate IA of the housing 1 using screws 18.

A pair of plate-like magnets 8 are held in a plate-like magnet holder 6 which is a part of an electromagnetic diaphragm pump and preferably formed of a material such as aluminium. The pair of diaphragm 4 are attached to both ends of the magnet holder 6 by using pressing tools 5 and screws 7 The magnet holder 6 and magnets 8 constitute the vibrator of the electromagnetic diaphragm pump.

Inside each head cover 3, a diaphragm chamber 3A is formed. On each diaphragm chamber 3A, there are formed an intake port 14A and a discharge port 15A, which are provided with an intake valve 14 and a discharge valve 15, respectively.

Each field core 9 is an iron core of laminated silicon steel plates in the shape of "E", and, as shown in FIG. 9, the central leg thereof is fitted in a coil 11 wound around a bobbin 10.

The electromagnetic diaphragm pump is provided with two such field cores 9, which are fixed to the bottom of the housing 1 using bolts 12 and nuts 13 so as to sandwich the magnet holder 6. Since it is needed to support the field cores 9 apart from the bottom of the housing 1 by a predetermined distance, a sleeve 16 is passed through with the bolt 12 as shown in FIG. 10.

Such electromagnetic diaphragm pump is attached through, for instance, rubber vibration insulators 19, to a fluid tank 20 as seen in FIG. 8. A pressurized fluid such as air is discharged into the tank 20 as shown by an arrow C via a tube 17 connected to the head cover 3.

FIG. 11 is a schematic plan view for showing the operation principle of the electromagnetic diaphragm pump. In FIG. 11, the symbols same as those in FIG. 8 or FIG. 10 indicate the same or identical portions.

A pair of magnets 8 attached to the magnet holder 6 are arranged, as shown, so that the magnetic poles of the pair of magnets 8 are reverse to each other. Accordingly, if the coil is supplied with an a.c. current so that a magnetic flux passes from one field core 9 to the other field core 9 in the direction of a solid arrow P or a dotted arrow Q, the magnet holder 6 is reciprocated in the direction of an arrow R by the attractive and repulsive actions between the magnets 8 and a magnetic flux P or Q, whereby the diaphragm 4 is vibrated.

As a result, as shown in FIG. 9 by an arrow A, a fluid is sucked into the diaphragm chamber 3A through the side plate 1A of the housing 1, an opening 1D formed in the diaphragm plate 2 and head cover 3, the intake port 14A and intake valve 14, and the fluid passes through the discharge port 15A and discharge valve 15 and then the fluid is discharged from the tube 17 into the fluid tank 20 as shown by the arrow C in FIG. 8.

Such electromagnetic diaphragm pump is described in, for instance, the Japanese Patent Laid-open Publication No. Showa 61-252881 and the Utility Model Laid-open Publication Nos. Showa 63-100682 and 61-137892.

FIG. 12 is a plan view of the prior magnet holder 6, and FIG. 13 is a side view of the magnet holder 6. In these figures, the magnet holder 6 is formed of a non-magnetic material such as aluminium and has formed therein a pair of magnet insertion windows 6A in the main portion thereof and a pair of threaded holes 6B to be screwed with the screws 7 at the both ends (FIG. 8).

Each magnet insertion window 6A has a shape substantially same as the contour of the magnet 8, and the magnet 8 is inserted therein. After that, a bonding agent of the epoxy resin or the like is applied on the area of boundary between the magnet 8 and the window 6A, whereby the magnet 8 is fixed to the magnet holder.

The thickness of the magnet holder 6 is usually same as the thickness of the magnet 8. And, since the magnet 8 with comparatively small magnetic force can be used if the requested flow rate or output pressure of the electromagnetic diaphragm pump is small. The smaller the tickness of the magnet, the more inexpensive the cost of the electromagnetic diaphragm pump can be made, which is convenient. However, since the magnet holder 6 is required to have formed therein the threaded holes 6B for attaching the diaphragms 4, it is not allowed to be thinner than a certain thickness.

Therefore, sometimes the magnet holder 6 having a thickness greater than that of the magnet must be used for attaching the magnet. In this case, a predetermined jig is required for attaching the magnet.

FIG. 14 is an exploded perspective view showing a method in which magnet 8A of a thickness smaller than that of the magnet holder 6 is attached to the magnet holder 6.

On a workboard 30 on which the magnet holder 6 is to be mounted, a pair of jigs 31 each having a thickness half of the difference between the thickness of the magnet holder 6 and that of the magnet 8A are fixed so as to correspond to the magnet insertion windows 6A of the magnet holder 6.

The magnet holder 6 is mounted on said workboard 30 as shown by an arrow G so that the jigs 31 are received in the magnet insertion windows 6A When the magnet 8A is inserted into the magnet insertion window 6A as shown by an arrow H, the jig 31 is positioned under the magnet 8A, so that the magnet 8A is arranged at the center of the magnet holder 6 in the thickness direction thereof.

After that, as shown in FIG. 15, a bonding agent 32 is applied on the area of boundary between the magnets 8A and the windows 6A, and after the bonding agnet 32 has dried up, the holder 6 with magnets is reversed, and the bonding agent is applied on the perimeters of the magnets 8A and the windows on the opposite main surfaces thereof. With the operation mentioned above, the magnets 8A are fixed at the center of the magnet holder 6 in the thickness direction thereof, completing the vibrator of the electromagnetic diaphragm pump.

When the magnets 8A are thus placed at the center of the magnet holder 6 in the thickness direction thereof, the center of gravity of the vibrator is positioned on the line passing through the connection points of a pair of diaphragms 4 to the magnet holder 6, so that the balance of the reciprocation of the vibrator can be maintained in a good condition.

The above described prior art had the following problems.

When the magnets 8A with the thickness smaller than that of the magnet holder 6 are attached to the magnet holder 6, the jigs 31 are required, and since the bonding agent must be applied on both surfaces of the magnet holder 6 and the magnets 8A, the assembling of the vibrator is cumbersome.

SUMMARY OF THE INVENTION

The object of the present invention is to provide a magnet holder and a vibrator for a diaphragm pump wherein any jigs are not required when one or plural magnets with the thickness smaller than that of the magnet holder are attached to the magnet holder to constitute the vibrator.

To accomplish the above-mentioned object, the present invention is characterized in that a stopper is formed on the inner perimeter of the side wall of the magnet insertion window in the vicinity of one main plane of the magnet holder, and that the supporting surface of the stopper for the magnet is fixed at the distance of ½ of the difference between the thicknesses of the magnet holder and the magnet to be inserted into the magnet insertion window, from the one main plane. As a result, by merely inserting the magnet into the magnet insertion window to abut it against the supporting surface, the magnet can be arranged at the center of the magnet holder in the thickness direction thereof without using any jigs.

Also, the present invention is characterized in that a plurality of said stoppers are formed partially along the inner periphery of the magnet insertion window. As a result, the mass of the vibrator becomes smaller and the inertia becomes smaller, too.

Further, there is also a characteristic feature in that recesses are formed in appropriate portions of the perimeter of the magnet insertion window, into which the bonding agent is made to flow. With this construction, the bonding agent easily flows in between the magnet and the magnet holder, whereby the fixing of the magnet becomes firmer.

BRIEF DESCRIPTION OF THE DRAWING

FIG. 1 is a front view of one embodiment of the present invention;

FIG. 2 is a partially cross-sectional side view when FIG. 1 is seen from the E—E line;

FIG. 3 is an enlarged view of J-part of FIG. 2;

FIG. 4 is an exploded perspective view showing a method for attaching magnet 8A with thiCkness thinner than that of a magnet holder 460 to the magnet holder 460;

FIG. 6 is seen from the F—F line;

FIG. 9 is seen from the X—X line;

DETAILED DESCRIPTION OF THE INVENTION

Now, the present invention is described in detail with reference to the drawings. In FIGS. 1-3, in both ends of a plate-like magnet holder 460, threaded holes 460B for attaching a pair of diaphragms are formed, and in the main portion thereof, magnet insertion windows 460A for receiving a pair of plate-like magnets are formed.

The magnet insertion windows 460A have substantially the same shape as the magnets to be inserted, and on one main surface side of each window (the right surface in FIGS. 2 and 3), a stopper 460C is formed so that it can possibly be on a level with the one main surface of the magnet holder 460. The stopper 460C is vertically projecting inwardly from the inner wall of the window to a short distance. The shape of the space portion left inside the stopper 460C is set a little smaller than the contour shape of the magnet 8A so that the magnet 8A can stably be mounted thereon. The distance "a" of the inner or supporting surface of the stopper 460C from the one main surface or the end face of the holder 460 is established to ½ of the difference between the thickness "c" of the magnet holder 460 and the thickness "d" of the magnet 8A. As a result, when the magnet 8A is inserted into the magnet insertion window 460A to abut one surface of the magnet 8A to the supporting surface of the stopper 460C, the distance "b" from the opposite main surface of the magnet 8A to the end face of the magnet holder 460 opposite to the one main surface having the stopper 460C becomes same as the distance "a". That is, the bisectors of the magnet 8A and the holder 460 in the respective thickness directions thereof are coincident with each other.

FIG. 4 is a schematic view showing a method for attaching the magnets 8A each having a thickness smaller than that of the magnet holder 460 to the magnet holder 460. In FIG. 4, the symbols same as FIGS. 1-3 represent the same or identical portions.

Figure 15:
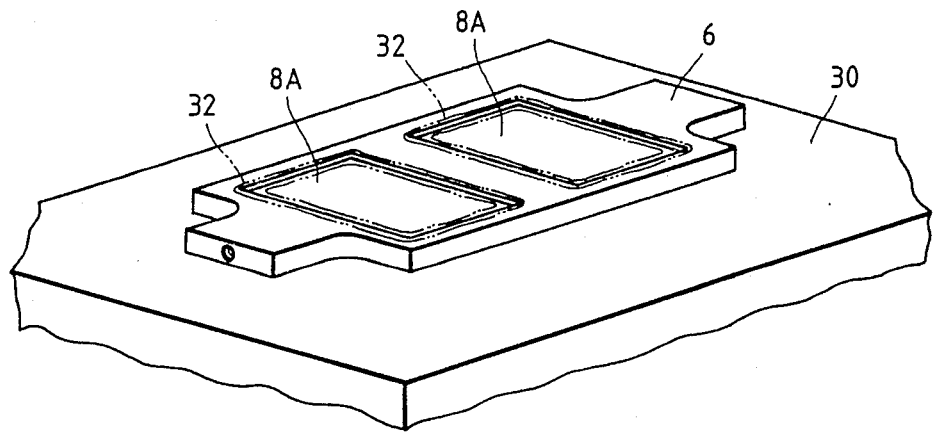
FIG. 15 is a perspective view showing the applying of a bonding agent for fixing the magnets to the holder.
Figure 14:
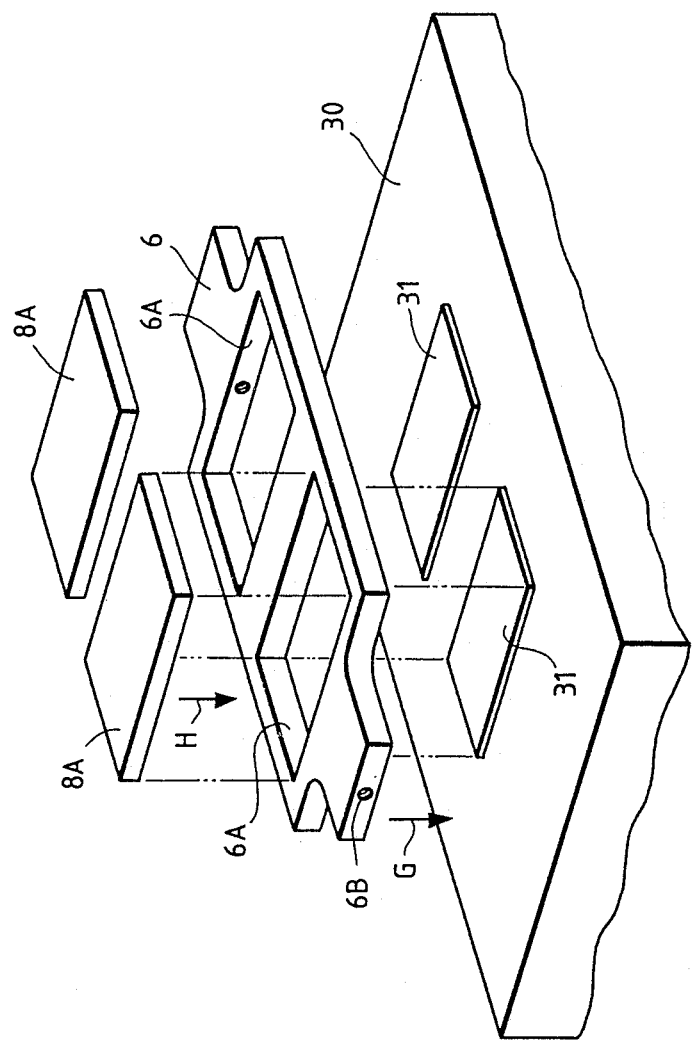
FIG. 14 is an exploded perspective view showing a conventional method for attaching magnets being thinner than the thickness of the magnet holder of FIG. 12 to said magnet holder.

As seen from FIG. 4, to attach the magnet 8A to the magnet holder 460, it is not needed to use any jigs or the like, but it is only needed to simply insert each magnet 8A into the magnet insertion window 460A from one side on which the stopper 460C is not formed and to abut the edge of the magnet 8A against the supporting surface of the stopper 460C. After that, in order to prevent the magnet 8A from running off from the window, a bonding agent is applied, as in FIG. 15, on the periphery portion where the side of the magnet insertion window 460A having no stopper 460C formed thereon abut the magnet 8A. This completes the vibrator.

Incidentally, a bonding agent may previously be applied on the inner wall of the magnet insertion window 460A before inserting the magnet 8A into the magnet insertion window 460A.

Figure 5:
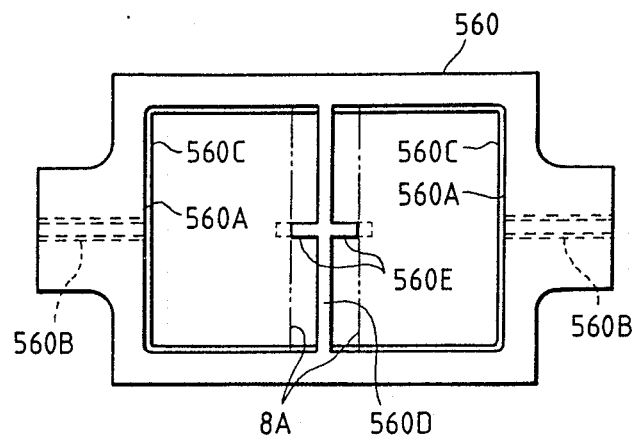
FIG. 5 is a front view of another embodiment of the present invention.

FIG. 5 is a front view of another embodiment of the present invention. Also, in this example, there are formed on the opposite ends of a magnet holder 560 a pair of threaded holes 560B for attaching a pair of diaphragms and a pair of magnet insertion windows 560A into which a pair of magnets are inserted and attached. A stopper 560C similar to 460C of FIG. 3 is provided, too.

As apparent from the comparison of FIG. 5 with FIG. 1, in this embodiment, a rib 560D is formed between a pair of insertion windows 560A. On the central portion of the rib 560D, magnet pressers 560 are projectingly formed for supporting the magnets 8A inserted into the magnet insertion windows 560A from the lateral direction. With this construction, electromagnetic loss due to the eddy current caused by the alteration of the magnetic flux passing through the vibrator can be reduced even if the holder is made of a conductive material such as aluminium, so the efficiency of the electromagnetic diaphragm pump is increased.

Figure 6:
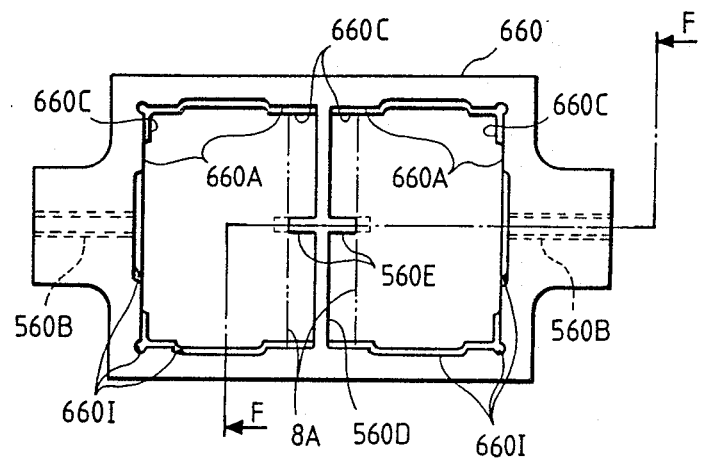
FIG. 6 is a front view of still another embodiment of the present invention.
Figure 7:
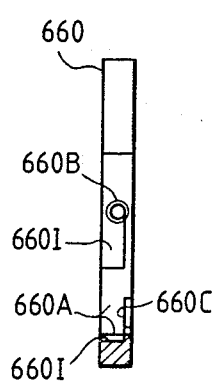
FIG. 7 is a partially cross-sectional side view when
Figure 8:
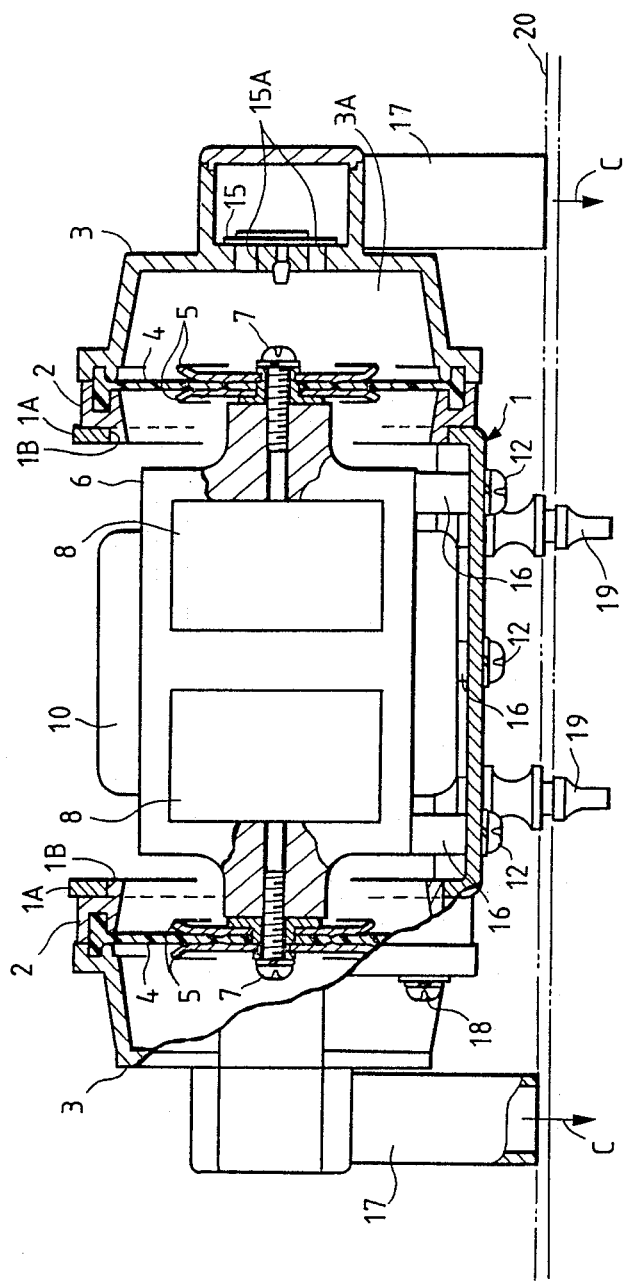
FIG. 8 is a cross-sectional view when a typical electromagnetic diaphragm pump is seen from the front thereof.
Figure 9:
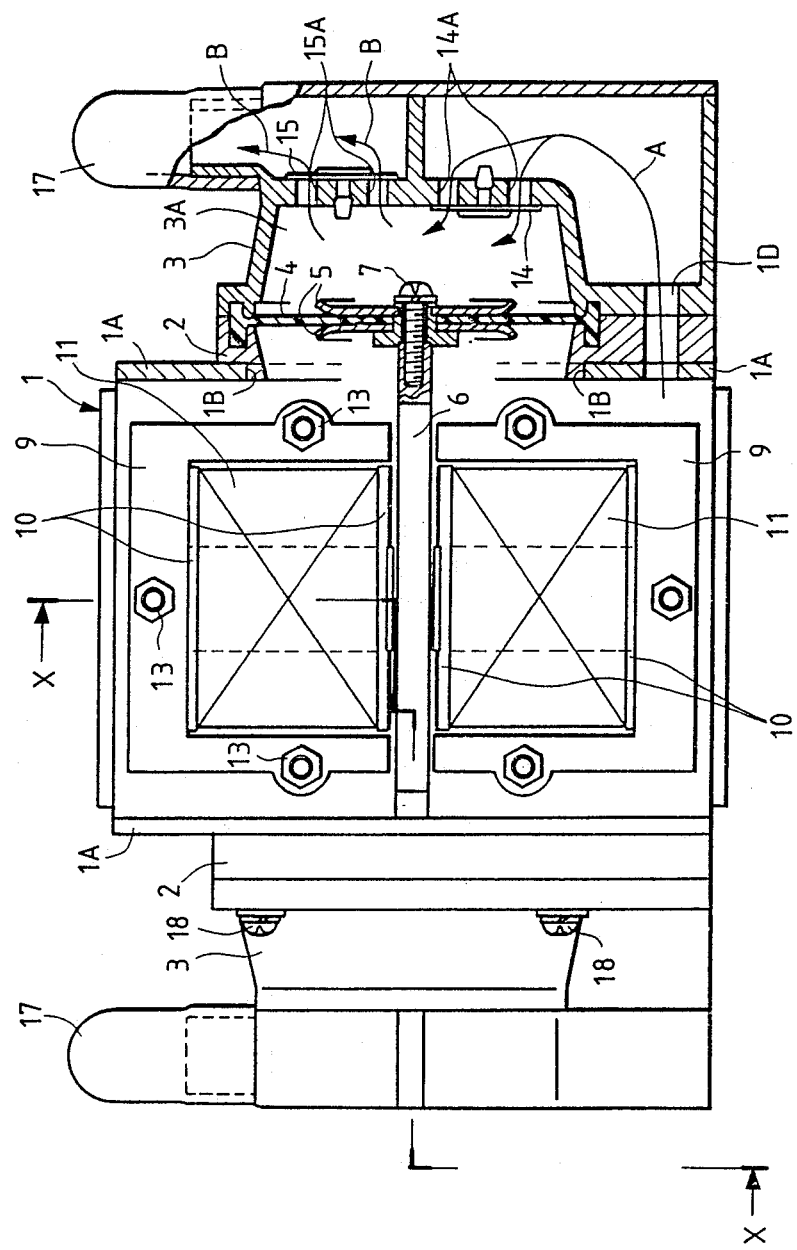
FIG. 9 is a plan view of the electromagnetic diaphragm of FIG. 8.
Figure 10:
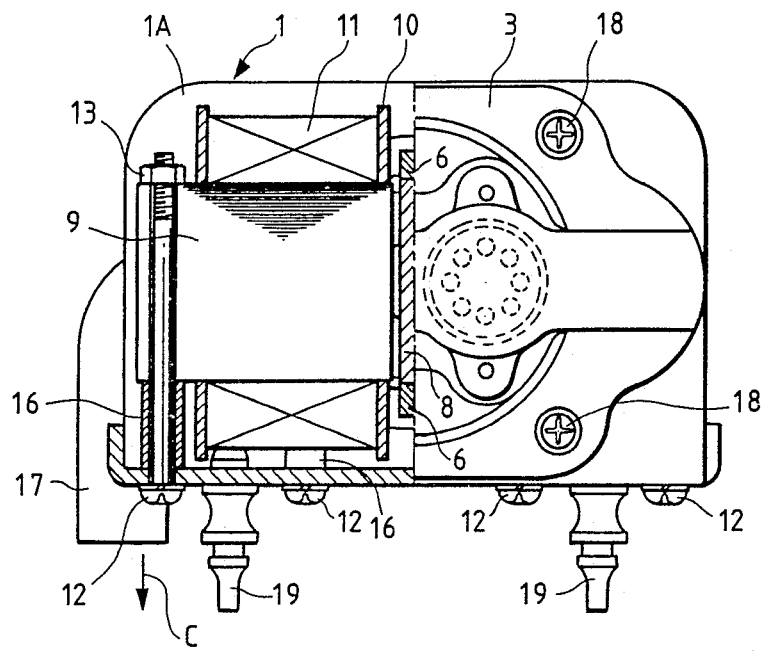
FIG. 10 is a partially cross-sectional side view when
Figure 11:
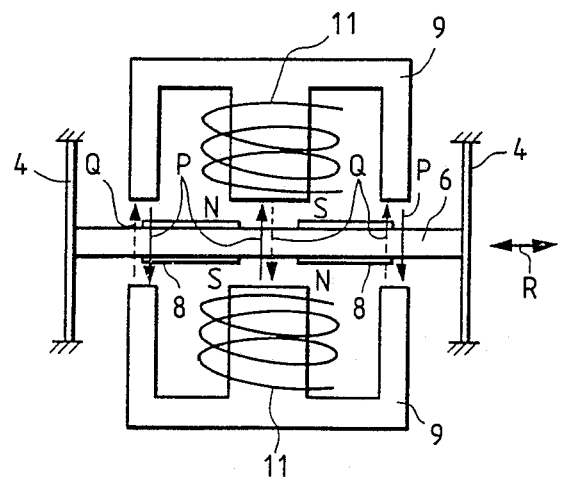
FIG. 11 is a schematic plan view showing the operation principle of the electromagnetic diaphragm pump.
Figure 12:
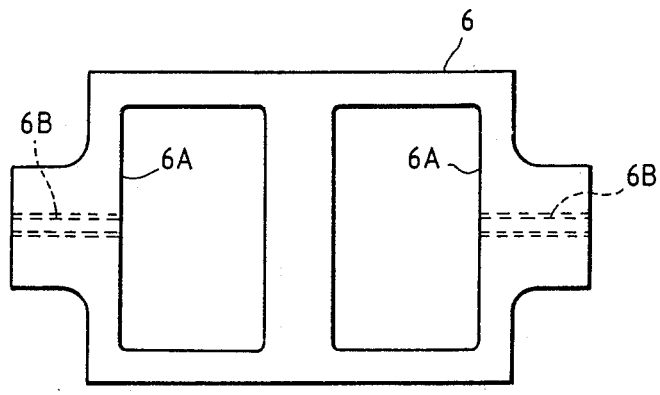
FIG. 12 is a front view of the conventional magnet holder.
Figure 13:
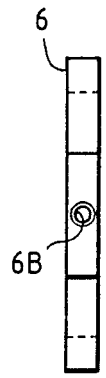
FIG. 13 is a side view of the magnet holder of FIG. 12.

FIG. 6 is a front view of still another embodiment of the present invention, and FIG. 7 is a representation when FIG. 6 is seen from the F—F line. In FIG. 6, the symbols same as FIG. 5 represent the same or identical portions. In these figures, around each of the magnet insertion window 660A formed in a magnet holder 660, at positions which do not adversely affect the positioning of the magnet 8A when the magnet 8A is inserted into the magnet insertion window 660A, some recesses 660I are formed so that there are clearances between the magnet insertion window 660A and the magnet 8A. The recesses 660I are filled with a bonding agent when or after the magnet 8A is inserted into the magnet insertion window 660A. This will make the bonding agent easily flow in between the magnet 8A and the magnet holder 660, whereby the fixing of the magnet 8A to the magnet holder 660 can be accomplished more firmly.

Further, the stoppers 600C formed in the periphery of the inner wall of magnet insertion window 660A are formed only in the four corners of the magnet insertion window 660A In other words, the stoppers 660C are formed in a plural number and partially along the inner periphery of the magnet insertion window 660A.

In this way, by forming the stoppers 660C not along the whole perimeter of the magnet insertion window 660A but only partially or intermittently, the mass and inertia force of the holder can be reduced. In the embodiments of FIGS. 5 and 6, as shown by dotted lines in the respective figures, the stopper may be formed on the tip of each magnet presser 560E.

It is not always needed to provide a pair of magnet insertion windows but a single or more than two magnet insertion windows may be possible for the vibrator of the electromagnetic diaphragm pump.

As apparent from the above description, the following technical advantages can be achieved by the present invention.

The magnets can be placed at the center of the magnet holder in the thickness direction thereof without using any jigs or the like, whereby said vibrator can easily be assembled.

The magnets and the magnet holder can firmly be fixed only by bonding them at the portions in the main surface of the magnet holder opposite to the side on which the stoppers are formed after inserting the magnets into the magnet insertion windows. That is, only by fixing only one side of the magnets to the magnet holder with a bonding agent, the magnets can firmly be fixed to the magnet holder. Accordingly, the vibrator can more easily be assembled.

Moreover, since one side of each magnet abuts on the supporting surface of the stopper, a fear that the bonding agent fixing the magnet and magnet holder peels off from the magnet or the magnet holder and the magnet run off from the magnet holder reduces to half as compared with the prior art. More specifically, in the conventional magnet holder in which no stopper is formed, the bonding agent for fixing the magnets and magnet holder is applied on both main surfaces of the magnet holder, so if the bonding agent peeled off, the magnets could run off either side of the magnet holder, but in accordance with the present invention, the magnets never run off from the side at which they abut on the stopper.

Electromagnetic loss due to the eddy current caused by the alternation of the magnetic flux passing through the vibrator can be reduced even if the holder is made of a conductive material such as aluminium, so the efficiency of the electromagnetic diaphragm pump is increased.

If recesses are formed along the periphery of the magnet insertion window and a bonding agent is made to flow into the recesses, the bonding agent easily flows in between the magnet and the magnet holder, whereby the bonding of the magnet to the magnet holder Can more firmly be achieved.

What is claimed is:

1. A plate-like magnet holder for an electromagnetic diaphragm pump extending between a pair of diaphragms which are placed so as to be opposed to each other, having both ends thereof connected to the respective diaphragms, provided with at least one magnet insertion window for holding at least one plate-like magnet, respectively, with predetermined spacing therebetween in the direction in which the pair of diaphragms are arranged, and having a thickness larger than that of the at least one magnet, the magnet holder comprising stoppers adapted for supporting and positioning the magnet to be inserted in the insertion window, said stopper being formed so as to project inwardly from the inner periphery of the side wall of the magnet insertion window in the vicinity of one main surface of the magnet holder, and the distance from the one main surface to the supporting surface of the stoppers being set to substantially ½ of the difference between the thickness of the magnet holder and that of the magnet.

2. The magnet holder for the electromagnetic diaphragm pump as claimed in claim 1 wherein the magnet holder is made of non-magnetic material.

3. A plate-like magnet holder for an electromagnetic diaphragm pump extending between a pair of diaphragms which are placed so as to be opposed to each other, having both ends thereof connected to the respective diaphragms, provided with at least one magnet insertion window for holding at least one plate-like magnet, respectively, with predetermined spacing therebetween in the direction in which the pair of diaphragms are arranged, and having a thickness larger than that of the at least one magnet, the magnet holder comprising stoppers adapted for supporting and positioning the magnet to be inserted in the insertion window, said stopper being formed so as to project inwardly from the inner periphery of the side wall of the magnet insertion windows in the vicinity of one main surface of the magnet holder, and the distance to the supporting surface of the stoppers from the one main surface is defined so that the central plane of the plate-like magnet to be inserted in the thickness direction thereof is effectively coincident with the central plane of the magnet holder in the thickness direction thereof.

4. The magnet holder for the electromagnetic diaphragm pump as claimed in claim 1 wherein the stoppers are formed at least in a plural number and partially along the inner periphery of the side wall of the magnet insertion window.

5. The magnet holder for the electromagnetic diaphragm pump as claimed in claim 3 wherein the stoppers are formed at least in a plural number and partially along the inner periphery of the side wall of the magnet insertion window.

6. The magnet holder for the electromagnetic diaphragm pump as claimed in claim 1 wherein there are formed in said magnet insertion window recesses for filling a bonding agent between the magnet and the magnet holder.

7. The magnet holder for the electromagnetic diaphragm pump as claimed in claim 3 wherein there are formed in said magnet insertion window recesses for filling a bonding agent between the magnet and the magnet holder.

8. An vibrator for an electromagnetic diaphragm pump comprising a plate-like magnet holder extending between a pair of diaphragms arranged so as to be opposed to each other, having both ends thereof connected to the respective diaphragms, and provided with at least one magnet insertion windows formed with a predetermined spacing therebetween in the direction in which the pair of diaphragms are arranged, and at least one plate-like magnets fixed in the insertion windows, and the thickness of the magnet holder being set to be larger than that of the magnets, the vibrator comprising stoppers for supporting and positioning the inserted magnet, said stopper being formed so as to project inwardly from the inner periphery of the side wall of the magnet insertion windows in the vicinity of one main surface of the magnet holder, and the distance from the one main surface to the supporting surface of the stoppers being set to substantially $\frac{1}{2}$ of the difference between the thickness of the magnet holder and that of the magnets.

9. An vibrator for an electromagnetic diaphragm pump comprising a plate-like magnet holder extending between a pair of diaphragms arranged so as to be opposed to each other, having both ends thereof connected to the respective diaphragms, and provided with at least one magnet insertion windows formed with a predetermined spacing therebetween in the direction in which the pair of diaphragms are arranged, and at least one plate-like magnets fixed in the insertion windows, and the thickness of the magnet holder being set to be larger than that of the magnets, the vibrator comprising stoppers for supporting and positioning the inserted magnet, said stopper being formed so as to project inwardly from the inner periphery of the side wall of the magnet insertion windows in the vicinity of one main surface of the magnet holder, and the distance to the supporting surface of the stoppers from the one main surface is defined so that the central plane of the plate-like magnets to be inserted in the thickness direction thereof is effectively coincident with the central plane of the magnet holder in the thickness direction thereof.

10. The vibrator for the electromagnetic diaphragm pump as claimed in claim 8 wherein the plate-like magnets are fixed to the magnet holder by the bonding agents lying on the periphery of the surface opposite to that to be brought in contact with the stoppers and on the inner wall surface of the magnet insertion windows.

11. The vibrator for the electromagnetic diaphragm pump as claimed in claim 9 wherein the plate-like magnets are fixed to the magnet holder by the bonding agents lying on the periphery of the surface opposite to that to be brought in contact with the stoppers and on the inner wall surface of the magnet insertion windows.

* * * * *